United States Patent [19]

Toyoshima et al.

[11] 4,199,611

[45] Apr. 22, 1980

[54] CACAO BUTTER SUBSTITUTE

[75] Inventors: Yasuo Toyoshima; Tadasu Ito; Shouji Maruzeni; Nozomi Yasuda; Kimio Terada, all of Tokyo, Japan

[73] Assignee: Asahi Denka Kogyo K.K., Tokyo, Japan

[21] Appl. No.: 938,713

[22] Filed: Aug. 30, 1978

[51] Int. Cl.$^2$ ............................................. A23D 5/00
[52] U.S. Cl. ..................................................... 426/607
[58] Field of Search ............................... 426/601, 607

[56] References Cited

U.S. PATENT DOCUMENTS

| | | | |
|---|---|---|---|
| 3,012,890 | 12/1961 | Dutton et al. | 426/607 X |
| 3,084,049 | 4/1963 | Sinnema | 426/607 |
| 3,133,819 | 5/1964 | Gooding | 426/607 |
| 3,492,130 | 1/1970 | Harwood | 426/607 |
| 3,537,865 | 11/1970 | Daniels et al. | 426/607 |
| 4,041,188 | 8/1977 | Cottier et al. | 426/607 |
| 4,072,766 | 2/1978 | Luddy et al. | 426/607 |

*Primary Examiner*—Robert A. Yoncoskie

*Attorney, Agent, or Firm*—Blanchard, Flynn, Thiel, Boutell & Tanis

[57] ABSTRACT

A cacao butter substitute comprising a triglyceride composition wherein the saturated fatty acid radicals comprise substantially palmitic acid radical, stearic acid radical and arachidic acid radical and the molar proportion of the arachidic acid radical to the total saturated fatty acid radicals is 4 to 15 molar % and that of the palmitic acid radicals is 10 to 65 molar % and that of the stearic acid radicals is 20 to 86 molar %; the unsaturated fatty acid radicals comprise substantially oleic acid radical and linoleic acid radical and the molar proportion of linoleic acid radical to the total unsaturated fatty acid radicals is less than 20 molar %; and the proportions of the glycerides are as follows, based on the total triglyceride components: 1 to 5 molar % of trisaturated triglycerides, 50 to 80 molar % of $\beta$-unsaturated-$\alpha,\alpha'$-disaturated triglycerides, less than 5 molar % of $\alpha$- or $\alpha'$-unsaturated-disaturated triglycerides, 15 to 50 molar % $\alpha$- or $\alpha'$-saturated-diunsaturated triglycerides, less than 5 molar % $\beta$-saturated-diunsaturated triglycerides and less than 6 molar % triunsaturated triglycerides.

3 Claims, No Drawings

CACAO BUTTER SUBSTITUTE

BACKGROUND OF THE INVENTION

1. FIELD OF THE INVENTION

The present invention relates to a cacao butter substitute. More particularly, the present invention relates to a cacao butter substitute, especially a temper-type cacao butter substitute, wherein the saturated fatty acid radicals comprise substantially palmitic acid radical, stearic acid radical and arachidic acid radical; the unsaturated fatty acid radicals comprise substantially oleic acid radical and linoleic acid radical; and the proportions of respective triglycerides are critically limited.

2. DESCRIPTION OF THE PRIOR ART

Investigations and development of cacao butter substitutes are promoted by the insufficient supply of cacao butter due to an increase in the demand for chocolate. Cacao butter, which has been used advantageously as a butter ingredient of chocolate, has a characteristic physical property that, unlike other ordinary natural or processed oils or fats, it melts quite rapidly at a temperature near human body temperature, although it is solid at and below ambient temperature. This specific melting property of cacao butter is attributable to the fact that the triglycerides that constitute the cacao butter comprise substantially $\beta$-unsaturated-$\alpha$, $\alpha'$-disaturated triglycerides and the triglyceride composition as a whole is very simple.

An indispensable requirement of an acceptable cacao butter substitute is that at least its physical properties, particularly its melting property, must be substantially equivalent to those of cacao butter. The general fundamental ideas for imparting physical properties, equivalent to those of cacao butter, to a cacao butter substitute can be divided roughly into two ideas from the viewpoint of the triglyceride composition of the cacao butter substitute. One idea is that the triglyceride composition of the cacao butter substitute is made as close as possible to that of natural cacao butter. If the triglyceride composition of the cacao butter substitute is similar to that of natural cacao butter, the physical properties of the former are like those of the latter as a matter of course. The other idea is that the triglyceride composition of the cacao butter substitute is not necessarily made like that of natural cacao butter, but rather, only the physical properties, particularly the melting property, of the substitute are made equivalent to those of cacao butter. This is possible because substantially the same physical properties can be obtained even though the triglyceride compositions are different. In the classification of cacao butter substitutes based on triglyceride compositions, the former will be referred to hereinafter as "cacao butter-type cacao butter substitute" and the latter will be referred to as "non-cacao butter-type cacao butter substitute". Further, cacao butter substitutes are generally classified into "temper-type cacao butter substitutes" and "non-temper type-cacao butter substitutes", based on the differences in the steps of using same in preparing chocolate. The difference between them resides in whether or not it is necessary to use a tempering step (temper type) or it is unnecessary to use a tempering step (non-temper type) in the chocolate preparation process. Generally, it is considered that cacao butter-type cacao butter substitutes correspond to the temper type and non-cacao butter-type cacao butter substitutes correspond to the non-temper type.

Cacao butter-type cacao butter substitutes are prepared by fractionating natural oils and fats to obtain $\beta$-unsaturated-$\alpha$, $\alpha'$-disaturated triglycerides (hereinafter referred to as SUS). As a generally useful fractionation method, there may be mentioned solvent fractionation. As starting oils and fats to be subjected to the factionation, those containing a large amount of SUS triglyceride components are desirable.

One of the typical processes for preparing non-cacao butter type cacao butter substitutes comprises hydrogenating a starting oil to form a large amount of triglyceride components having a melting property like that of SUS-type triglycerides and then fractionating the same.

As is readily inferable from the triglyceride composition thereof, the melting property and the crystallizing property of a non-cacao butter-type cacao butter substitute change significantly if it is mixed with cacao butter, while such properties of cacao butter-type cacao butter substitute are not significantly changed by such mixing. Therefore, the mixing weight ratio of non-cacao butter-type cacao butter substitutes to cacao butter is naturally limited. The flavor and taste of cacao butter are very important for chocolate and, therefore, cacao butter-type cacao butter substitutes having a higher compatibility with cacao butter are far more desirable for the preparation of high quality chocolate. In the preparation of chocolate from cacao butter-type cacao butter substitute used together with cacao butter, a tempering step is inevitable. In this tempering step, a chocolate dough is cooled while it is undergoing kneading under proper conditions to form desired, stable crystal nuclei of oil and fat uniformly in the dough. After the subsequent molding and cooling tunnel steps, chocolate plates having uniform crystals therein and a smooth surface are obtained. By forming the uniform crystalline structure in the solid, the phenomenon of fat blooms, which is frequently observed during storage of chocolate, can be prevented. If the tempering step is omitted or if tempering is incomplete in this system, fat blooms are caused whereby the commercial value of the chocolate is lost.

When a non-temper type cacao butter substitute is used, the phenomenon of fat blooms is not so serious even if the tempering step (which is necessary when a temper type cacao butter substitute is used) is omitted. A reason therefor is considered to be that the triglyceride compositions of general non-temper type cacao butter substitutes are far more complicated than those of temper-type cacao butter substitutes or cacao butter and, in addition, the triglyceride crystals of the non-temper type cacao butter substitutes resulting after solidification by cooling are metastable and a very long period of time is required to transform them into the most stable crystals, namely, the transition is not effected during practical shelf life so that significant amounts of large crystals of oil and fat are not formed.

As the temper-type cacao butter substitutes of desirable triglyceride compositions, there may be mentioned those having triglyceride compositions very close to those of cacao butter. For example, in the specification of Japanese Pat. Laid-Open No. 9507/1974, it is disclosed that a preferred cacao butter substitute has a triglyceride composition wherein the sum of $\beta$-oleopalmitostearotriglyceride (abbreviated as POSt) and $\beta$-oleodistearotriglyceride (abbreviated as StOSt) which are the main ingredients of the triglyceride composition, is at least 85% based on the total triglycerides. The cacao butter substitutes in which the sum of POSt and StOSt is at least 85%, based on the total triglycerides, are highly compatible with cacao butter because the triglyceride compositions of the former are very close to that of the latter. However, it is to be noted that even if mixtures of those cacao butter substitutes and cacao butter are used, it is not always possible to prepare chocolate possessing satisfactory properties with respect to fat bloom resistance. This fact has been revealed by experiments wherein chocolates were prepared from cacao butter and cacao butter substitutes of known triglyceride compositions and then the chocolates were subjected to fat bloom resistance tests. In this connection, it is to be noted that chocolates prepared from only cacao butter do not have a high fat bloom resistance. Namely, since cacao butter is mainly comprised of $\alpha,\alpha'$-disaturated-$\beta$-unsaturated symmetric triglycerides, its crystal transition proceeds far more rapidly in comparison with other oils and fats but, on the other hand, a considerable period of time is required for the transition into stable crystals in a sufficient amount, whereby fat blooms are liable to be formed. Accordingly, if the triglyceride composition of a cacao butter substitute is made close to that of cacao butter, the above properties of the cacao butter will be observed also in the cacao butter substitute. The fact that a cacao butter substitute having a triglyceride composition very close to that of natural cacao butter has a low fat bloom resistance is considered to be not due to poor compatibility with cacao butter, but rather, it is due to other reasons as described above. Another reason is that owing to the very simple triglyceride composition, the crystals grow into larger crystals which move out to the chocolate surface. The fat blooms reduce greatly the commercial value of chocolate. The fat blooms are apt to be formed particularly under storage conditions which involve large temperature changes. It is no exaggeration to say that the shelf life of chocolate in countries where there are large seasonal temperature changes, like in Japan, depends substantially on the fat bloom resistance of the chocolate.

Further, the known cacao butter substitutes having triglyceride compositions very close to those of cacao butter also have other properties of natural cacao butter which will be described below.

Cacao butter exhibits a specific melting property at its melting point of 34° C., since it comprises mainly disaturated-unsaturated symmetric triglycerides (wherein the saturated acids are stearic acid and palmitic acid). However, generally in low temperature seasons in which chocolates are demanded in a larger amount, the specific melting property of cacao butter rather produces a feeling of a poor melting property in the mouth. For example, in most low-temperature districts of Japan such as Tohoku, Hokkaido, Hokuriku, ChubuSangaku and San'in Districts, chocolates comprising cacao butter produce a feeling of a poor melting property in the mouth during winter. The same phenomena will occur in the northern part of Europe and America, especially during the winter.

The first object of the present invention is to provide a temper-type cacao butter substitute possessing excellent physical properties, such as melting property in the mouth, which is free of the above-described defects of known cacao butter-type cacao butter substitutes and which has a high compatibility with cacao butter and remarkably improves the fat bloom resistance of chocolate made from a mixture of cacao butter and the cacao butter substitute according to the invention.

The second object of the present invention is to provide a temper-type cacao butter substitute having the properties desired in the preparation of chocolate such as a quick solidifying property and a releasing property.

SUMMARY OF THE INVENTION

The cacao butter substitute of the present invention comprises a triglyceride composition wherein the saturated fatty acid radicals comprise substantially palmitic acid radical (abbreviated as P), stearic acid radical (abbreviated as St) and arachidic acid radical (abbreviated as A) and the proportion of the arachidic acid radical to the total saturated fatty acid radicals is 4 to 15 molar %; the unsaturated fatty acid radicals comprise substantially oleic acid radical (abbreviated as O) and linoleic acid radical (abbreviated as L) and the proportion of linoleic acid radical to the total unsaturated fatty acid radicals is less than 20 molar %; and the proportions of the glycerides are as follows, based on the total triglyceride components, 1 to 5 molar %, preferably 1 to 3 molar % trisaturated triglycerides (abbreviated as SSS or $S_3$), 50 to 80 molar %, preferably 55 to 75 molar %, of $\beta$-unsaturated-$\alpha$, $\alpha'$-disaturated triglycerides (abbreviated as SUS), less than 5 molar %, preferably less than 3 molar %, of $\alpha$- or $\alpha'$-unsaturated-disaturated triglycerides (abbreviated as SSU), 15 to 50 molar %, preferably 25 to 45 molar %, of $\alpha$- or $\alpha'$-saturated diunsaturated triglycerides (abbreviated as SUU), less than 5 molar %, preferably less than 3 molar %, of $\beta$-saturated-diunsaturated triglyceride (abbreviated as USU) and less than 6 molar %, preferably less than 4 molar %, of triunsaturated triglycerides (abbreviated as UUU or $U_3$).

The proportion of the palmitic acid radical to the total saturated fatty acid radicals is from 10 to 65 molar % and that of the stearic acid radical to this is from 20 to 86 molar %.

The present invention will be further described below in detail.

A characteristic feature of the cacao butter substitute of the present invention is that the saturated fatty acid radicals comprise substantially palmitic acid radical, stearic acid radical and arachidic acid radical, and the proportion of arachidic acid radical to the total saturated fatty acid radicals is 4 to 15 molar %. The proportion of arachidic acid radical to the total saturated acid radicals is especially important. The triglyceride composition mainly comprises SUS and SUU triglycerides for increasing the fat bloom resistance.

After repeated tests on bloom resistance, the inventors have found that the bloom resistance is reduced seriously if the proportion of the arachidic acid to the total saturated fatty acids is less than 4 molar % or more than 15%. Also the bloom resistance is reduced seriously if the proportions of SUS and SUU are not within the above ranges.

A publication suggests that the combination of SUU triglyceride and SUS triglyceride, in which the SUS triglyceride is the majority, but the SUU triglyceride is contained in a larger amount than usual, is apt to cause fat blooms. This teaching is based on investigations of various combinations of cacao butter and various fractions. However, it is to be noted that the cacao butter substitute of the present invention exhibits a remarkable fat bloom resistance, even though it contains a larger amount of SUU than the SUU content of cacao butter. This is considered to be due to the proportions of the palmitic acid radical, the stearic acid radical and the arachidic acid radical based on the total saturated fatty acid radicals. If the proportions of those acid radicals to the total saturated fatty acid radicals are not within the ranges specified in the present invention and the triglyceride composition mainly comprise SUS and SUU, a satisfactory bloom resistance cannot be obtained.

The reasons why the cacao butter substitute of the present invention exhibits a remarkable fat bloom resistance are considered to be that the chain length distribution of the saturated fatty acids constituting the saturated fatty acid component of the total triglycerides is broader than that of known cacao butter substitute compositions and, therefore, the melting point of a mixture thereof with cacao butter lies in a broader range. In addition, transformations of crystals due to crystal transition of cacao butter in solid form is inhibited.

The indispensable properties of cacao butter substitutes are excellent fat bloom resistance and excellent melting property in the mouth. Generally, there have been intensive investigations on cacao butter substitutes having fat bloom resistance or on additives thereof. However, it was revealed by the investigations that even cacao butter substitutes having excellent effects of fat bloom resistance exhibit a remarkable reduction in melting point when they are mixed with cacao butter whereby to reduce the heat resistance of the chocolate or to make the tempering treatment unfavorably difficult.

As a means of improving merely the melting property in the mouth, there has been known a method wherein a substance of a melting point lower than that of cacao butter, such as palm intermediate fraction, is added thereto. However, this method has the disadvantages that the additive is limited in amount and the thermal resistance and the bloom resistance of chocolate are reduced.

Further, although the thermal resistance of chocolate can be increased by incorporation of StOSt fraction which is a high melting fraction obtained from shea butter, the melting point thereof is increased too high to make it acceptable as a cacao butter substitute, thereby producing a poor melting property in the mouth and making it impossible to obtain a sharp melting property of cacao butter in the mouth. Although cacao butter substitutes which satisfy all physical properties required of cacao butter substitutes are thus very difficult to obtain, cacao butter substitutes having fatty acid components and triglyceride components in specified ranges, as described in the present invention, have an excellent melting property in the mouth, and a sufficient fat bloom resistance and thermal resistance.

The important points of the present invention which distinguish same from known cacao butter substitutes are that the amount of SUU fraction is 15 to 50 molar %, preferably 25 to 45 molar %, based on the total triglyceride components and that the amount of the arachidic acid radical is 4 to 15 molar % based on the total saturated fatty acid radicals in the system substantially comprising palmitic acid radical, stearic acid radical and arachidic acid radical.

If the SUU fraction is a large proportion of the total triglyceride components, the melting property of the chocolate is improved remarkably but the intrinsic thermal resistance of the chocolate is reduced seriously as described above. It has been found, however, that arachidic acid included in the saturated fatty acids in the SUU fraction increases the intrinsic thermal resistance of the chocolate.

Generally, the arachidic acid radical exhibits a function of elevating the melting points of triglyceride components. The elevation of melting point is apparently contrary to at least the object of obtaining a cacao butter substitute having an excellent melting property in the mouth. After investigations on cacao butter substitutes with various proportions of arachidic acid and various proportions of SUS fraction and SUU fraction to the total triglyceride components, the inventors have found the cacao butter substitute of the present invention, containing fatty acid components in the specified ranges and triglyceride components in the specified ranges, have an excellent melting property in the mouth, thermal resistance and bloom resistance. Outside said ranges, only the melting property in the mouth is improved, or only the thermal resistance is improved but melting property in the mouth remains poor or only the bloom resistance is improved, so that outside said ranges it is impossible to obtain cacao butter substitutes possessing all the properties of excellent melting property in the mouth, thermal resistance and bloom resistance.

Now, description will be made concerning the triglyceride components other than SUS and SUU. When SUS and SUU are within the ranges limited according to the present invention, the following conditions are provided.

Although the presence of a large amount of SSS is not desirable in view of the melting property in the mouth, the presence of 1 to 5 molar %, particularly 1 to 3 molar %, of SSS is preferred, since it is apt to accelerate the solidification velocity of chocolate by cooling and to impart fat bloom resistance.

Although the SSU component corresponds to the SUS component in the sense that both of them belong to the general class $S_2U$, the effect of the SUS component cannot be expected in SSU, since in the SSU structure, a saturated acid is bonded in the $\beta$-position of the triglyceride structure. In other words, SSU and SUS are different from each other in the crystal transition velocity and an excellent homogeneous composition cannot be obtained from SSU by a conventional tempering treatment. SSU has physical properties close to, but not identical to, those of SSS and the presence of a large amount of SSU is not desirable. Thus, the presence of less than 5 molar %, particularly less than 3 molar %, of SSU is preferred.

Though the USU component is considered to be related to the SUU component, the presence of less than 5 molar %, particularly less than 3 molar %, of the USU component is preferred, because it exerts an influence on the hardness of the cacao butter substitute to make the tempering operation of chocolate difficult and further to soften the chocolate, thereby making it impossible to obtain a sharp melting property in the mouth.

Although UUU is generally not preferred as a component of a cacao butter substitute, it is less harmful than USU. The presence of less than 6 molar %, particularly less than 4 molar %, of UUU is preferred, since an excessive amount of UUU causes a reduction in the melting point of the cacao butter substitute, a reduction in the solidification velocity thereof upon cooling and so-called "oil-off", since the UUU component is easily separated out from the chocolate tissue at room temperature when it is used for chocolate preparation.

The saturated fatty acid radicals in the SUS triglyceride component comprise palmitic acid radical, stearic acid radical and arachidic acid radical. The unsaturated fatty acid radicals in the SUS triglyceride component comprise substantially oleic acid radical and linoleic acid radical. As the unsaturated fatty acid radical in the β-position, oleic acid radical is preferred. Linoleic acid has an apparent effect as if the amount of SUU is increased. Thus, if linoleic acid is present in a large amount, the proper balance between SUS and SUU is lost and thereby the desired properties of thermal resistance, melting property in the mouth and bloom resistance are diminished. It is preferred that the amount of linoleic acid radical is, therefore, less than 20 molar %, based on the total unsaturated fatty acid radicals.

Further, although the POP β-oleodipalmitotriglyceride (abbreviated as POP) component is an indispensable constituent of SUS, the presence of a large amount of POP component is not preferred.

A reason why the presence of a large amount of POP is undesirable is that particularly as compared with other β-oleyl-α, α'-disaturated triglycerides in SUS components, POP has a relatively lower compatibility with cacao butter and causes a reduction in the melting point thereof, thereby requiring an excessive cooling in the tempering step of chocolate preparation. As a result, the viscosity increase of the chocolate is remarkable which makes the operation difficult and further the bloom resistance and the thermal resistance of the chocolate are reduced unfavorably as described above. Thus, the amount of POP is preferably less than 20 molar %, based on the total SUS components.

The fatty acid radical distribution of the triglycerides in the cacao butter substitute of the present invention can vary in a wide range, unless the fatty acid radicals are limited selectively and exclusively to only one radical. For example, in SUS components, a case wherein the triglyceride constituting SUS is limited selectively and exclusively to PUP, StUSt or AUA is not included in the present invention. A case wherein a relatively large amount of PUSt or StUA is contained therein is included in the triglyceride composition of the present invention. As a matter of course, a triglyceride wherein PUP, PUSt, PUA, StUSt, StUA and AUA are distributed is included in the present invention.

As described above in detail, the cacao butter substitutes of the present invention have excellent physical properties like those of cacao butter substitutes in all aspects owing to the special fatty acid components and triglyceride components contained therein.

The cacao butter substitute of the present invention can be prepared from triglyceride compositions obtained by organic synthesis and/or from natural oils and fats and processed natural oils and fats. The organic synthesis of the triglyceride compositions can be effected by, for example, the process of R. O. Feuge, et al. [J. Phys. Chem. Vol. 58, p. 64 (1954), J. Amer. Oil Chemists Soc., Vol. 48, p. 116 (1971)]. The desired respective triglyceride components (such as SSS, SSU, SUS, SUU, USU AND UUU) can be obtained in a purity of higher than 99%.

The cacao butter substitute of the present invention can be prepared by combining those triglyceride components in suitable proportions. On the other hand, the cacao butter substitute of the present invention can be prepared from natural oils and fats or processed natural oils and fats such as one or more of palm oil, shea butter, mowrah butter, sal seed butter and fractionated butters of them. If necessary, triglyceride components synthesized as described above can be incorporated therein.

The following examples further illustrate the present invention.

EXAMPLES 1–4

Triglyceride components having different structures of SSS, SSU, SUS, SUU, USU and UUU were obtained according to organic synthesis and solvent fractionation and/or column chromatography. Those six triglyceride components were mixed in proper proportions to obtain four triglyceride compositions. The components of those four triglyceride compositions, i.e. compositions I (Example 1), II (Example 2), III (Example 3) and IV (Example 4) are shown in Table 1.

TABLE 1

| Triglyceride composition No. | Triglyceride component | Triglyceride component (molar %) | Fatty acid components of triglycerides (molar %) | | | | | Triglyceride components of SUS fraction | (molar %) | | | Total fatty acid components (molar %) | | | | |
|---|---|---|---|---|---|---|---|---|---|---|---|---|---|---|---|---|
| | | | P | St | A | O | L | | | | | P | St | A | O | L |
| I | SSS | 2 | 40.0 | 45.0 | 15.0 | 0.0 | 0.0 | POP | 13.6 | PLP | 2.4 | 24.3 | 27.3 | 9.1 | 33.4 | 5.9 |
| | SSU | 2 | 26.7 | 30.0 | 10.0 | 28.3 | 5.0 | POSt | 30.6 | PLSt | 5.4 | | | | | |
| | SUS | 78 | 26.7 | 30.0 | 10.0 | 28.3 | 5.0 | POA | 10.2 | PLA | 1.8 | | | | | |
| | SUU | 16 | 13.3 | 15.0 | 5.0 | 56.7 | 10.0 | StOSt | 17.2 | StLSt | 3.0 | | | | | |
| | USU | 0 | — | — | — | — | — | StOA | 11.5 | StLA | 2.0 | | | | | |
| | UUU | 2 | 0.0 | 0.0 | 0.0 | 85.0 | 15.0 | AOA | 1.9 | ALA | 0.3 | | | | | |
| II | SSS | 3 | 40.0 | 50.0 | 10.0 | 0.0 | 0.0 | POP | 14.4 | PLP | 1.6 | 23.1 | 28.9 | 5.8 | 38.1 | 4.2 |
| | SSU | 2 | 26.7 | 33.3 | 6.7 | 30.0 | 3.3 | POSt | 36.0 | PLSt | 4.0 | | | | | |
| | SUS | 70 | 26.7 | 33.3 | 6.7 | 30.0 | 3.3 | POA | 7.2 | PLA | 0.8 | | | | | |
| | SUU | 19 | 13.3 | 16.7 | 3.3 | 60.0 | 6.7 | StOSt | 22.5 | StLSt | 2.5 | | | | | |
| | USU | 1 | 13.3 | 16.7 | 3.3 | 60.0 | 6.7 | StOA | 9.0 | StLA | 1.0 | | | | | |
| | UUU | 5 | 0.0 | 0.0 | 0.0 | 90.0 | 10.0 | AOA | 0.9 | ALA | 0.1 | | | | | |
| III | SSS | 3 | 30.0 | 60.0 | 10.0 | 0.0 | 0.0 | POP | 8.1 | PLP | 0.9 | 16.4 | 32.8 | 5.5 | 40.8 | 4.5 |
| | SSU | 1 | 20.0 | 40.0 | 6.7 | 30.0 | 3.3 | POSt | 32.4 | PLSt | 3.6 | | | | | |
| | SUS | 60 | 20.0 | 40.0 | 6.7 | 30.0 | 3.3 | POA | 5.4 | PLA | 0.6 | | | | | |
| | SUS | 31 | 10.0 | 20.0 | 3.3 | 60.0 | 6.7 | StOSt | 32.4 | StLSt | 3.6 | | | | | |
| | USU | 2 | 10.0 | 20.0 | 3.3 | 60.0 | 6.7 | StOA | 10.8 | StLA | 1.2 | | | | | |
| | UUU | 3 | 0.0 | 0.0 | 0.0 | 90.0 | 10.0 | AOA | 0.9 | ALA | 0.1 | | | | | |
| IV | SSS | 3 | 15.0 | 80.0 | 5.0 | 0.0 | 0.0 | POP | 2.1 | PLP | 0.1 | 7.9 | 42.2 | 2.6 | 44.9 | 2.4 |
| | SSU | 0 | — | — | — | — | — | POSt | 22.8 | PLSt | 1.2 | | | | | |
| | SUS | 55 | 10.0 | 53.3 | 3.3 | 31.7 | 1.7 | POA | 1.4 | PLA | 0.1 | | | | | |
| | SUU | 36 | 5.0 | 26.7 | 1.6 | 63.3 | 3.3 | StOSt | 60.8 | StLSt | 3.2 | | | | | |
| | USU | 3 | 5.0 | 26.7 | 1.6 | 63.3 | 3.3 | StOA | 7.6 | StLA | 0.4 | | | | | |
| | UUU | 3 | 0.0 | 0.0 | 0.0 | 95.0 | 5.0 | AOA | 0.2 | ALA | 0.0 | | | | | |

COMPARATIVE EXAMPLES 1-3

Triglyceride components having different structures of SSS, SSU, SUS, SUU, USU and UUU were obtained according to organic syntheses and solvent fractionation and/or column chromatography. Those six triglyceride components were mixed together in proper proportions to obtain three triglyceride compositions.

| Chocolate composition | | |
|---|---|---|
| Cacao mass | 16 | wt. % |
| Cacao butter substitute | 25 | |
| Non-defatted milk powder | 9 | |
| Sugar | 50 | |
| Lecithin | 0.4 | |

TABLE 3

| | Examples | | | | Comparative Examples | | |
|---|---|---|---|---|---|---|---|
| | 1 | 2 | 3 | 4 | 1 | 2 | 3 |
| Bloom resistance test 20° C./30° C. 24 hrs./24 hrs. Cycle number | 38 | 34 | 34 | 31 | 14 | 12 | 10 |
| Test on melting property in the mouth (Functional test on palatability) (Number of panelists who praised the chocolates from the total of 15 panelists) | 14 | 14 | 15 | 14 | 8 | 6 | 11 |
| | | | | | Waxy | Too Soft | Slightly waxy |
| Thermal resistance (Distortion temperature, °C.) | 33.6 | 33.8 | 33.6 | 33.5 | 35.8 | 32.2 | 33.1 |
| Ease of operation upon viscosity increase in tempering step | Easy | Easy | Easy | Easy | Easy | Difficult | Difficult |

Components of those three triglyceride compositions, i.e. compositions V (Comparative Example 1), VI (Comparative Example 2) and VII (Comparative Example 3) are shown in Table 2.

TABLE 2

Components of Triglyceride Compositions (Comparative Examples 1, 2 and 3)

| Triglyceride composition No. | Triglyceride component | Fatty acid components of triglycerides (molar %) | | | | | Triglyceride components of SUS fraction | | | | Total fatty acid components (molar %) | | | | |
|---|---|---|---|---|---|---|---|---|---|---|---|---|---|---|---|
| | (molar %) | P | St | A | O | L | | (molar %) | | | P | St | A | O | L |
| V | SSS 1 | 20.0 | 70.0 | 10.1 | 0.0 | 0.0 | POP | 4.0 | PLP | 0.0 | 13.0 | 45.5 | 6.5 | 35.0 | 0.0 |
| | SSU 4 | 13.3 | 46.7 | 6.7 | 33.3 | 0.0 | POSt | 28.0 | PLSt | 0.0 | | | | | |
| | SUS 90 | 13.3 | 46.7 | 6.7 | 33.3 | 0.0 | POA | 4.0 | PLA | 0.0 | | | | | |
| | SUU 0 | — | — | — | — | — | StOSt | 49.0 | StLSt | 0.0 | | | | | |
| | USU 4 | 6.7 | 23.3 | 3.3 | 66.7 | 0.0 | StOA | 14.0 | StLA | 0.0 | | | | | |
| | UUU 1 | 0.0 | 0.0 | 0.0 | 100.0 | 0.0 | AOA | 1.0 | ALA | 0.0 | | | | | |
| VI | SSS 3 | 70.0 | 20.0 | 10.0 | 0.0 | 0.0 | POP | 48.0 | PLP | 1.0 | 46.4 | 13.3 | 6.6 | 33.0 | 0.7 |
| | SSU 3 | 46.7 | 13.3 | 6.7 | 32.7 | 0.7 | POSt | 27.4 | PLSt | 0.6 | | | | | |
| | SUS 90 | 46.7 | 13.3 | 6.7 | 32.7 | 0.7 | POA | 13,7 | PLA | 9.3 | | | | | |
| | SUU 2 | 23.3 | 6.7 | 3.3 | 65.3 | 1.3 | StOSt | 3.9 | StLSt | 0.1 | | | | | |
| | USU 2 | 23.3 | 6.7 | 3.3 | 65.3 | 1.3 | StOA | 3.9 | StLA | 0.1 | | | | | |
| | UUU 0 | — | — | — | — | — | AOA | 1.0 | ALA | 0.1 | | | | | |
| VII | SSS 2 | 50.0 | 50.0 | 0.0 | 0.0 | 0.0 | POP | 23.8 | PLP | 1.3 | 32.4 | 32.4 | 0.0 | 33.5 | 1.8 |
| | SSU 6 | 33.3 | 33.3 | 0.0 | 31.7 | 1.7 | POSt | 47.5 | PLSt | 2.5 | | | | | |
| | SUS 86 | 33.3 | 33.3 | 0.0 | 31.7 | 1.7 | POA | 0.0 | PLA | 0.0 | | | | | |
| | SUU 2 | 16.7 | 16.7 | 0.0 | 63.3 | 3.3 | StOSt | 23.8 | StLSt | 1.3 | | | | | |
| | USU 2 | 16.7 | 16.7 | 0.0 | 63.3 | 3.3 | StOA | 0.0 | StLA | 0.0 | | | | | |
| | UUU 2 | 0.0 | 0.0 | 0.0 | 95.0 | 5.0 | AOA | 0.0 | ALA | 0.0 | | | | | |

Chocolate samples were prepared from cacao butter substitutes obtained in Examples 1-4 and Comparative Examples 1-3 according to the following recipe. Tests on bloom, melting property in the mouth, heat resistance and ease of operation upon viscosity increase in tempering step were carried out. The results given below were obtained.

The embodiments of the invention in which an exclusive property or privilege is claimed are defined as follows:

1. A cacao butter substitute consisting essentially of a mixture of triglycerides of saturated and unsaturated fatty acids wherein the saturated fatty acids consist essentially of palmitic acid, stearic acid and arachidic acid with the proviso that the amount of arachidic acid moiety is from 4 to 15 molar %, the amount of palmitic acid moiety is from 10 to 65 molar % and the amount of stearic acid moiety is from 20 to 86 molar % based on the total saturated fatty acid moieties, wherein the unsaturated fatty acids consist essentially of oleic acid and linoleic acid with the proviso that the amount of linoleic acid moiety is less than 20 molar % based on the total unsaturated fatty acid moieties, and wherein the proportions of the triglycerides are as follows, based on the total triglycerides:
- 1 to 5 molar % of trisaturated triglycerides,
- 50 to 80 molar % of β-unsaturated-α, α'-disaturated triglycerides,
- zero to less than 5 molar % of α or α'-unsaturated-disaturated triglycerides,
- 15 to 50 molar % of α or α'-saturated-diunsaturated triglycerides,
- zero to less than 5 molar % of β-saturated-diunsaturated triglycerides, and
- zero to less than 6 molar % of triunsaturated-triglycerides.

2. A cacao butter substitute according to claim 1 in which the proportions of the triglycerides are as follows, based on the total triglycerides:
- 1 to 3 molar % of trisaturated triglycerides,
- 55 to 75 molar % of β-unsaturated-α, α'-disaturated triglycerides,
- zero to less than 3 molar % of α- or α'- unsaturated-disaturated triglycerides,
- 25 to 45 molar % of α- or α'-saturated-diunsaturated triglycerides,
- zero to less than 3 molar % of β-saturated-diunsaturated triglycerides, and
- zero to less than 4 molar % of tri-unsaturated triglycerides.

3. A cacao butter substitute according to claim 1, in which the amount of β-oleodipalmitotriglyceride is less than 20 molar %, based on the total β-unsaturated-α, α'-disaturated triglycerides.

* * * * *